United States Patent
Mitra et al.

(10) Patent No.: US 10,141,967 B1
(45) Date of Patent: Nov. 27, 2018

(54) VIRTUAL NETWORK INTERFACE CONNECTIVITY

(71) Applicant: FORD GLOBAL TECHNOLOGIES, LLC, Dearborn, MI (US)

(72) Inventors: Pramita Mitra, West Bloomfield, MI (US); Pietro Buttolo, Dearborn Heights, MI (US); Basavaraj Tonshal, Northville, MI (US); Qianyi Wang, Allen Park, MI (US); Gary Steven Strumolo, Canton, MI (US); Kelly Lee Zechel, Plymouth, MI (US); Brian Nash, Northville, MI (US); Theodore Wingrove, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/662,563

(22) Filed: Jul. 28, 2017

(51) Int. Cl.
| | |
|---|---|
| H04M 1/00 | (2006.01) |
| H04B 1/3822 | (2015.01) |
| H04L 29/08 | (2006.01) |
| H04W 4/80 | (2018.01) |
| H04W 88/04 | (2009.01) |

(52) U.S. Cl.
CPC ........... H04B 1/3822 (2013.01); H04L 67/02 (2013.01); H04L 67/12 (2013.01); H04W 4/80 (2018.02); *H04W 88/04* (2013.01)

(58) Field of Classification Search
CPC ...... H04B 1/3822; H04W 4/80; H04W 88/04; H04L 67/02

USPC ............ 455/414.1, 414.2, 440, 452.1, 456.1, 455/432.1, 412.1, 412.2, 569.2
See application file for complete search history.

(56) References Cited

U.S. PATENT DOCUMENTS

| | | | |
|---|---|---|---|
| 6,681,108 B1 * | 1/2004 | Terry | G06Q 10/10 340/5.1 |
| 9,036,509 B1 * | 5/2015 | Addepalli | H04W 4/046 370/259 |
| 2005/0170825 A1 * | 8/2005 | Dowling | G06Q 20/04 455/418 |
| 2005/0208947 A1 * | 9/2005 | Bahl | H04L 12/4633 455/450 |
| 2009/0298478 A1 * | 12/2009 | Tyhurst | H04W 4/50 455/414.1 |
| 2016/0360557 A1 | 12/2016 | Lavi et al. | |
| 2017/0034810 A1 | 2/2017 | Pal et al. | |

* cited by examiner

*Primary Examiner* — Sonny Trinh
(74) *Attorney, Agent, or Firm* — Jennifer M. Stec; Brooks Kushman P.C.

(57) ABSTRACT

A mobile device receives a message from a vehicle computing platform via remote process communication (RPC), updates an origin address of the message to indicate the mobile device, sends the message to a destination address of the message, receives a response message from the destination, updates a destination address of the response message to indicate the computing platform, and sends the response message to the computing platform via the RPC. A computing platform constructs a remote procedure call (RPC) message by a virtual network interface application for a request received from a vehicle application for a network protocol unsupported by a mobile device, and sends the RPC to the mobile device to cause the mobile device to update an origin address of the request to indicate the mobile device and send the request to a destination address of the request.

19 Claims, 3 Drawing Sheets

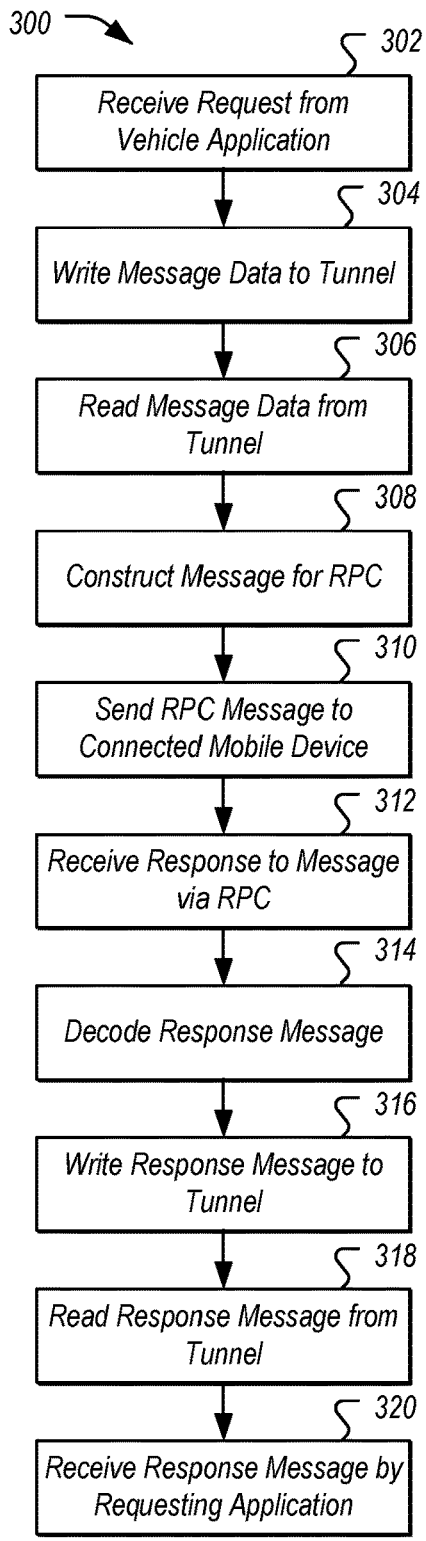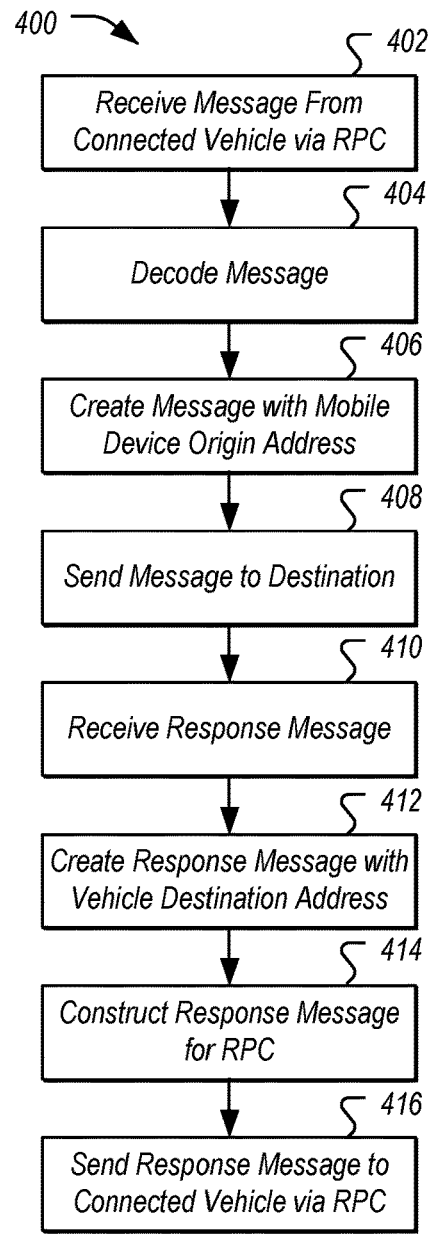
FIG. 3
FIG. 4

US 10,141,967 B1

VIRTUAL NETWORK INTERFACE CONNECTIVITY

TECHNICAL FIELD

Aspects of the disclosure generally relate to a virtual network interface for use by vehicle applications accessing network connectivity of a connected mobile device.

BACKGROUND

Mobile devices, such as smartphones, can be connected to a vehicle head unit to provide connected services to vehicle occupants. These connected services may include hands free calling, audio streaming, and integration with brought-in mobile device applications. Applications that are executed by the mobile device can make use of the network connectivity of the mobile device. However, applications that are executed by the vehicle require connection to the mobile device (e.g., via Wi-Fi, BLUETOOTH, or USB) to utilize the network connectivity of the mobile device.

SUMMARY

In one or more illustrative embodiments, a system includes a mobile device. The mobile device is programmed to receive a message from a vehicle computing platform via remote process communication (RPC), update an origin address of the message to indicate the mobile device, send the message to a destination address of the message, receive a response message from the destination, update a destination address of the response message to indicate the computing platform, and send the response message to the computing platform via the RPC.

In one or more illustrative embodiments, a system includes a computing platform. The computing platform is programmed to a computing platform programmed to construct a remote procedure call (RPC) message by a virtual network interface application for a request received from a vehicle application for a network protocol unsupported by a mobile device, and send the RPC to the mobile device to cause the mobile device to update an origin address of the request to indicate the mobile device and send the request to a destination address of the request.

In one or more illustrative embodiments, a method includes receiving, by a computing platform from a mobile device, indications of network protocols that are natively supported by the mobile device; receiving a request from a vehicle application utilizing a network protocol; sending the request to the mobile device for handling by a native application of the mobile device responsive to the network protocol being natively supported, and otherwise sending the request to the mobile application using a proxying approach.

BRIEF DESCRIPTION OF THE DRAWINGS

FIG. 3 illustrates an example process for the computing platform facilitating use by the vehicle application of network connectivity of the mobile device; and FIG. 4 illustrates an example process for the mobile device facilitating use by the vehicle application of network connectivity of the mobile device.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

When an application executed by a vehicle requests data using a standard protocol such as hypertext transfer protocol (HTTP), the vehicle can provide the HTTP header info to the connected device (e.g., via Smart Device Link (SDL)) and the mobile device may execute an application implementing the standard protocol as a remote service to upload or download data using the mobile device. However, if the vehicle application uses an application layer protocol such as MQ Telemetry Transport (MQTT) that is not supported by a service of the mobile device, the mobile device may be unable to fulfill the request to the vehicle application.

Although a vehicle occupant may configure a mobile device to act as a hotspot for the vehicle to use it as a modem, such a setup may prevent the occupant from using the mobile device for wireless projection to the vehicle user interface. Moreover, hotspot functionality typically requires a vehicle occupant to actively enable the hotspot that is generally not enabled.

An improved system and method for allowing vehicle applications to utilize connectivity of the mobile device is provided. An application executed by the vehicle computing platform utilizes a virtual network interface to represent a connected device network interface. Using a packet sniffer (e.g., a layer three packet sniffer), generated IP packets from the application are captured. These IP packets may be transferred to the mobile device using a remote procedure mechanism (e.g., SDL's RPC mechanism), where the source IP address of the packet is changed to the IP address of the mobile device. This updated IP packet is then sent to the destination IP from the mobile device. When a response to the packet is received back to the mobile device, the packet address is again updated, and the packet is routed back through the RPC mechanism (e.g., via to the SDL core) and therefore back to the vehicle application. The virtual network interface may further allow for vehicle applications to receive active network state information related to the connected mobile device (e.g., cellular connection, Wi-Fi connection, etc.). Further aspects of the disclosure are described in detail below.

Figure 1:
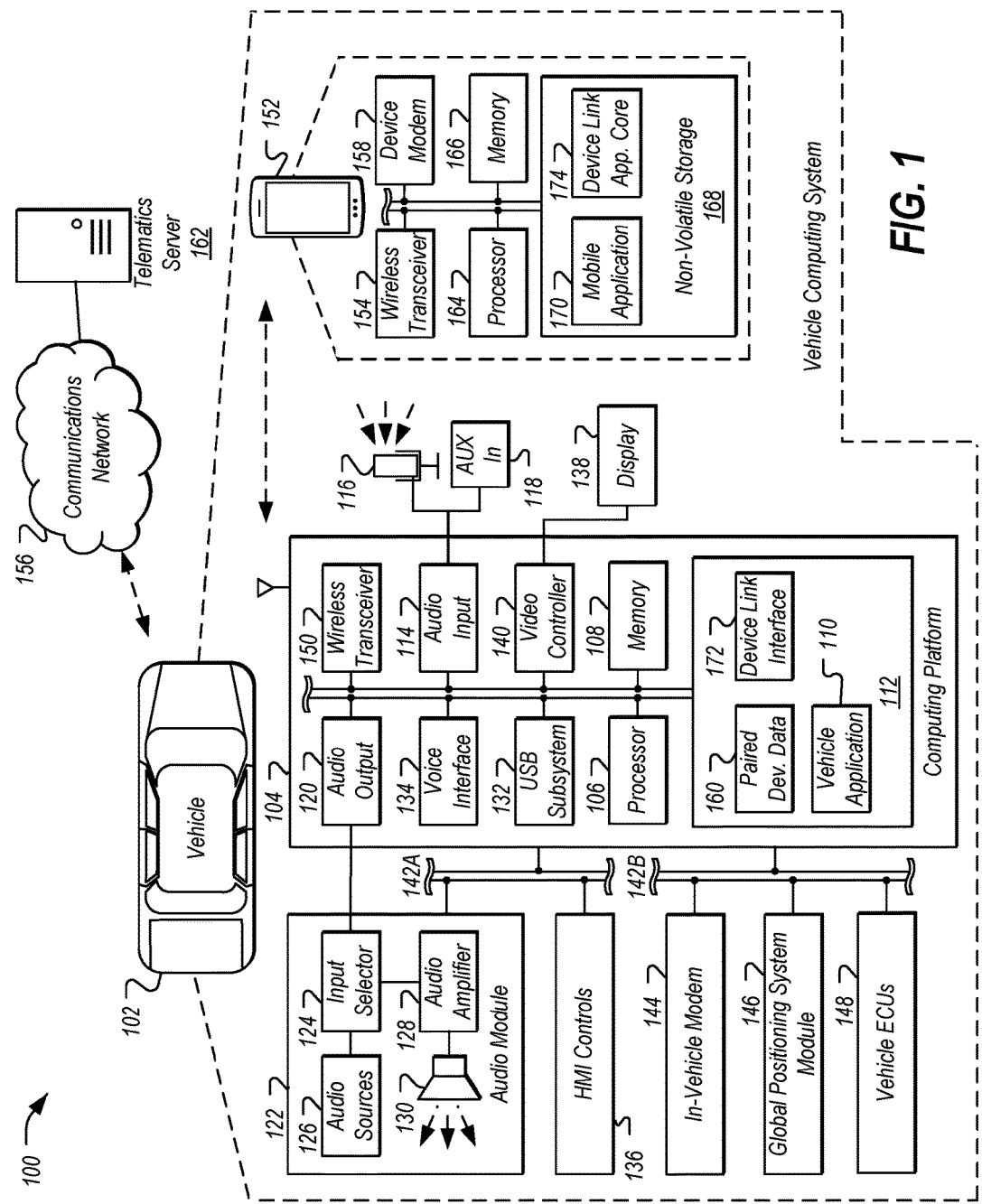
FIG. 1 illustrates an example diagram of a system configured to provide telematics services to a vehicle.

FIG. 1 illustrates an example diagram of a system 100 configured to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to a standard grammar describing available command functions, and voice prompt generation for output via the audio module 122. The voice interface 134 may utilize probabilistic voice recognition techniques using the standard grammar 176 in comparison to the input speech. In many cases, the voice interface 134 may include a standard user profile tuning for use by the voice recognition functions to allow the voice recognition to be tuned to provide good results on average, resulting in positive experiences for the maximum number of initial users. In some cases, the system may be configured to temporarily mute or otherwise override the audio source specified by the input selector 124 when an audio prompt is ready for presentation by the computing platform 104 and another audio source 126 is selected for playback.

The standard grammar 135 includes data to allow the voice interface 134 to match spoken input to words and phrases that are defined by rules in the standard grammar 135. The standard grammar 135 can be designed to recognize a predefined set of words or phrases. A more complex standard grammar 135 can be designed to recognize and organize semantic content from a variety of user utterances. In an example, the standard grammar 135 may include commands to initiate telematics functions of the vehicle 102, such as "call," "directions," or "set navigation destination." In another example, the standard grammar 135 may include commands to control other functionality of the vehicle 102, such as "open windows," "headlights on," or "tune to radio preset three."

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to corporate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132. In some examples the mobile device 152 may be battery powered, while in other cases the mobile device 152 may receive at least a portion of its power from the vehicle 102 via the wired connection.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics server 162 or other remote computing device. In one example, the computing platform 104 may utilize a data-over-voice plan or data plan of the mobile device 152 to communicate information between the computing platform 104 and the communications network 156. Additionally or alternatively, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics server 162 or other network services via the device modem 158.

For instance, the computing platform 104 may include a device link interface 172 to facilitate the integration of functionality of the mobile applications 170 configured to communicate with a device link application core 174 executed by the mobile device 152. In some examples, the mobile applications 170 that support communication with the device link interface 172 may statically link to or otherwise incorporate the functionality of the device link application core 174 into the binary of the mobile application 170. In other examples, the mobile applications 170 that support communication with the device link interface 172 may access an application programming interface (API) of a shared or separate device link application core 174 to facilitate communication with the device link interface 172.

The integration of functionality provided by the device link interface may include, as an example, the ability of mobile applications 170 executed by the mobile device 152 to incorporate additional voice commands into the grammar of commands available via the voice interface 134. The device link interface 172 may also provide the mobile applications 170 with access to vehicle information available to the computing platform 104 via the in-vehicle networks 142. An example of a device link interface 172 may be the SYNC APPLINK component of the SYNC system provided by the Ford Motor Company of Dearborn, Mich. Other examples of device link interfaces 172 may include MIRRORLINK, APPLE CARPLAY, and ANDROID AUTO.

Figure 2:
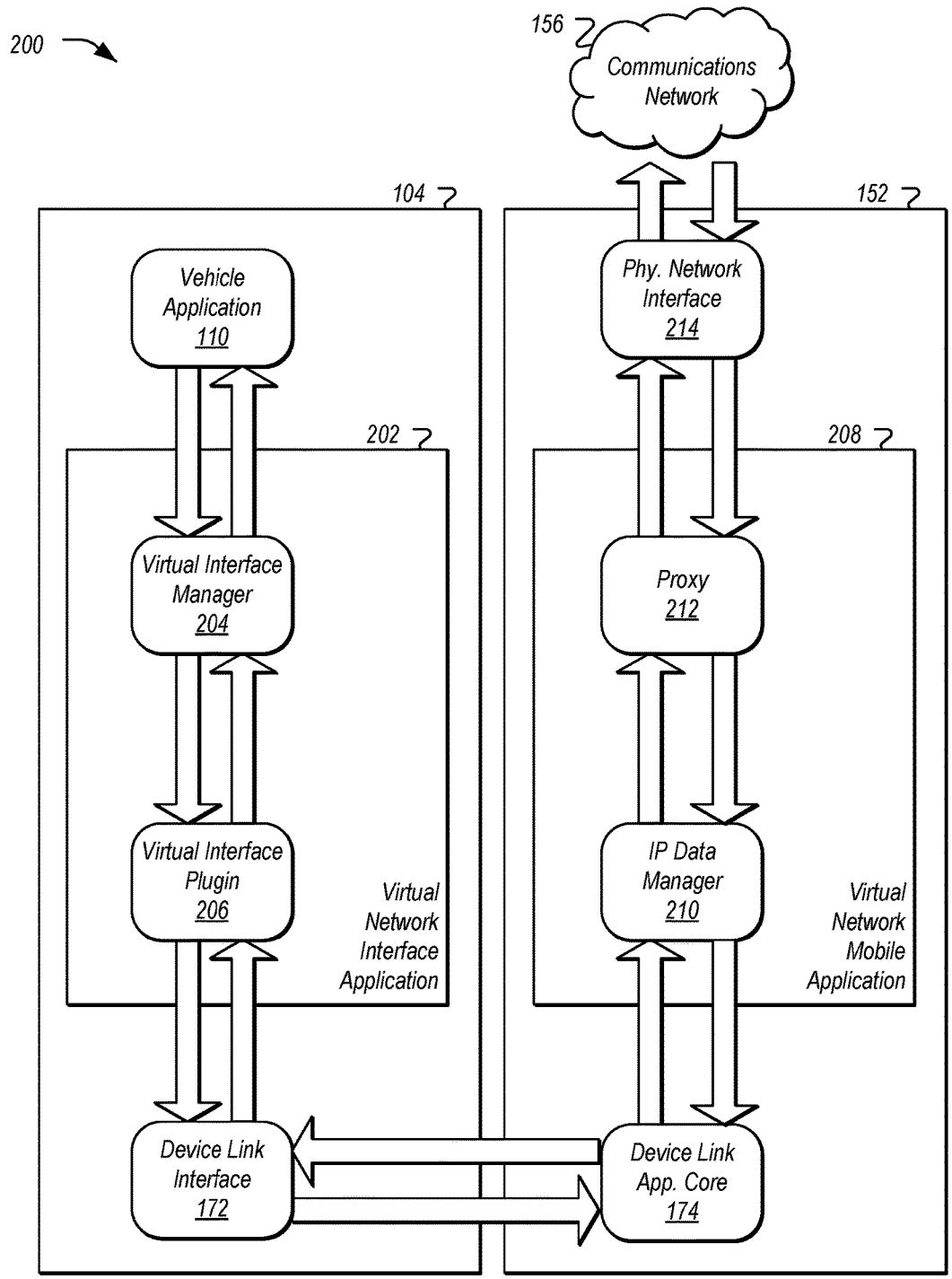
FIG. 2 illustrates an example data flow diagram of a vehicle application utilizing the network connectivity of the mobile device via a network interface proxy.

FIG. 2 illustrates an example data flow diagram 200 of a vehicle application 110 utilizing the network connectivity of the mobile device 152. This connectivity may be utilized by way of a virtual network interface application 202 of the computing platform 104 and a virtual network mobile application 208 of the mobile device 152.

The virtual network interface application 202 may be an example of a vehicle application 110 stored to the storage 112 and executed by the one or more processors 106 of the computing platform 104. The virtual network interface application 202 may include a virtual interface manager 204 and a virtual interface plugin 206. The virtual interface manager 204 may be configured to receive Internet Protocol (IP) packets or other data from the vehicle application 110, such as get or upload requests, and place those requests into a tunnel for processing by the virtual interface plugin 206. In an example, the virtual interface manager 204 of the virtual network interface application 202 uses a packet sniffer (e.g., a layer three packet sniffer) to captures IP packets generated from the vehicle application 110.

The virtual interface plugin 206 may be configured to access the tunnel traffic to send the traffic to the device link interface 172. In some examples, the virtual network interface application 202 may be configurable to utilize different device link interfaces 172. In such examples, the virtual network interface application 202 may include or otherwise have access to multiple virtual interface plugins 206, and may utilize the virtual interface plugin 206 that corresponds to the specific device link interface 172 being used.

The device link interface 172 and the device link application core 174 may be configured to maintain a communication link between the computing platform 104 and the mobile device 152. In an example, the communication link may be supported by services of the wireless transceiver 150 of the computing platform 104 (e.g., for a Wi-Fi or BLUETOOTH link), or by the services of the USB subsystem 132 of the computing platform 104 (e.g., for a USB link).

The virtual interface plugin 206 may utilize the device link interface 172 to transfer the IP packets monitored by the virtual interface manager 204 to the mobile device 152. In an example, the virtual interface plugin 206 may utilize a remote procedure mechanism (e.g., the RPC mechanism available via SDL) to send the packets to the mobile device 152. The device link application core 174 may receive data from the device link interface 172, and provide the received data to the virtual network mobile application 208.

The virtual network mobile application 208 may be an example of a mobile application 170 stored to the storage 168 and executed by the one or more processors 164 of the mobile device 152. The virtual network mobile application 208 may include IP data manager 210 and a proxy 212. The IP data manager 210 may be configured to receive and decode the binary packet data from the device link application core 174. The IP data manager 210 may be further configured to send the received IP packet data to the proxy 212.

The proxy 212 may be configured to create a new IP packet for the data received from the IP data manager 210. The proxy 212 may also update the source IP address of the packet to be that of the IP address of the mobile device 152, not that of the computing platform 104. The proxy 212 may further create a TCP socket and write the IP data packet to the physical network interface 214 of the mobile device 152. This updated IP packet may then be sent to the destination IP from the mobile device 152 via the physical network interface 214.

A response to the packet may be received back to the physical network interface 214 of the mobile device 152. The response packet may then be handed off to the virtual network mobile application 208. The proxy 212 may receive the response packet, updates the response packet back with the address information of the computing platform 104, and return it to the IP data manager 210. The IP data manager 210 may construct a binary representation and pass the representation to the device link application core 174. The device link application core 174 may send the response back via the RPC mechanism to the device link interface 172 to transfer the response to the virtual network interface application 202. The virtual interface plugin 206 of the virtual network interface application 202 may decode the packet according to the protocol of the virtual interface plugin 206, and may provide the decoded packet to the virtual interface manager 204 to be added to the tunnel. The vehicle application 110 may accordingly read the decoded packet from the tunnel. Accordingly, the vehicle application 110 may make use of the connection of the mobile device 152 to the communication network 156, without regard for whether the mobile device 152 supports the particular protocol being utilized by the vehicle application 110.

In addition to the flow of packets, the virtual network interface may further allow for vehicle applications 110 to receive active network state information related to the connected mobile device 152 (e.g., cellular connection, Wi-Fi connection, etc.). In an example, the vehicle application 110 may request network status information from the virtual network interface application 202, which may in turn cause the virtual interface plugin 206 to query the device link interface 172 for the status of the connection between the device link interface 172 and the device link application core 174. If there is no connection to a mobile device 152, the device link interface 172 may report to the virtual interface plugin 206 that no connection exists, which in turn may cause the virtual network interface application 202 to inform the vehicle application 110 that no network interface is available. If, however, a mobile device 152 is connected, the device link application core 174 may provide back to the device link interface 172 information regarding the network state of to the connected mobile device 152. In an example, the device link interface 172 may indicate whether the mobile device 152 is connected to the communications network 156 by the physical network interface 214 via a cellular connection and/or via a Wi-Fi connection. Additionally or alternately, the device link interface 172 may indicate other details of the network connection provided by the physical network interface 214, such as data connection speed, latency, and amount of packet loss or retransmissions.

FIG. 3 illustrates an example process 300 for the computing platform 104 facilitating use by the vehicle application 110 of network connectivity of the mobile device 152. In an example, the process 300 may be performed utilizing the virtual network interface application 202 of the computing platform 104.

At operation 302, the computing platform 104 receives a request from a vehicle application 110. In an example, the vehicle application 110 may send may send a get or upload request for MQTT to the virtual network interface application 202.

At 304, the computing platform 104 writes message data to a tunnel. In an example, the virtual interface manager 204 of the virtual network interface application 202 receives the request from the vehicle application 110, and places the requests into the tunnel. At 306, the computing platform 104 reads message data from the tunnel. In an example, the virtual interface plugin 206 accesses the tunnel traffic to receive the request. The virtual interface plugin 206 may further provide the request to the device link interface 172.

At 308, the computing platform 104 constructs a message for RPC. In an example, the device link interface 172 constructs the RPC message. At 310, the computing platform 104 sends the RPC message to the connected mobile device 152. In an example, the device link interface 172 sends the constructed RPC message to the connected mobile device 152. The mobile device 152 may process the RPC message as discussed in further detail with respect to the process 400.

At 312, the computing platform 104 receives a response to the message from the connected mobile device 152. In an example, the device link interface 172 receives the response as discussed in further detail with respect to the process 400. The device link interface 172 may further send the received response RPC message to the virtual interface plugin 206. At 314, the computing platform 104 decodes the response message. In an example, the virtual interface plugin 206 decodes the virtual interface plugin 206 decodes the received message in accordance with the type of connection provided by the device link interface 172.

At 316, the computing platform 104 writes the response message to the tunnel. In an example, the virtual interface plugin 206 writes the decoded message data to the tunnel. At 318, the computing platform 104 reads the response message to the tunnel. In an example, the virtual interface manage 204 reads the decoded message data to the tunnel responsive to a request by the vehicle application 110 for data from the connection. At 320, the vehicle application 110 of the computing platform 104 receives the response message. Accordingly, the vehicle application 110 may utilize the network services of the connected mobile device via RPC, even if the requested network services are not natively supported by the mobile device 152. After operation 320 the process 300 ends.

FIG. 4 illustrates an example process 400 for the mobile device 152 facilitating use by the vehicle application 110 of network connectivity of the mobile device 152. In an example, the process 300 may be performed utilizing the virtual network mobile application 208 of the mobile device 152.

At 402, the mobile device 152 receives a message from a connected vehicle 102 via RPC. In an example, the message may be received to the device link application core 174 responsive to the sending discussed above with respect to operation 310 of the process 300. At 404, the mobile device 152 decodes the message. In an example, the IP data manager 210 of the virtual network mobile application 208 receives the RPC message from the and decode the binary packet data from the device link application core 174. The IP data manager 210 may be further configured to send the received IP packet data to the proxy 212.

At 406, the mobile device 152 creates a message with the mobile device 152 as the origin address. In an example, the proxy 212 may update the source address of the message to be that of the address of the mobile device 152, not that of the computing platform 104. At 408, the mobile device 152 sends the message to a destination. In an example, the proxy 212 creates a socket and write the message to the physical network interface 214 of the mobile device 152. This updated message may then be sent to the destination address from the mobile device 152 via the physical network interface 214.

At 410, the mobile device 152 receives a response message. In an example, the response to the packet may be received back to the physical network interface 214 of the mobile device 152. The response packet may then be handed off to the virtual network mobile application 208. At 412, the mobile device 152 creates a message with the vehicle as the destination address. In an example, the proxy 212 updates the response packet back with the address information of the computing platform 104, and return it to the IP data manager 210. At 414, the mobile device 152 constructs a response message for RPC. In an example, the IP data manager 210 construct a binary representation and pass the representation to the device link application core 174.

At 416, the mobile device 152 sends the response message to the computing platform 104 of the connected vehicle 102 via RPC. The response message may be received by the computing platform 104 as discussed above regarding operation 312. After operation 416 the process 400 ends.

Variations on the aforementioned systems and processes are possible. In an example, the computing platform 104 may query the mobile device 152 for protocols that are natively supported by the mobile device 152. Based on the result of the query, if the mobile device 152 fails to support the protocol being requested by the vehicle application 110, the aforementioned processes 300 and 400 may be utilized. If, however, the mobile device 152 does have native capability to support the protocol, then a request for the mobile device 152 to utilize its native functionality may instead be sent, avoiding the tunneling and proxy operations. As a specific example, the mobile device 152 may respond that it supports HTTP but not MQTT or file transfer protocol (FTP). Accordingly, HTTP request for data may be sent to the mobile device via RPC to cause the mobile device 152 to utilize its native web browser to retrieve the requested data, and then to send back the requested data once retrieved. However, an FTP or MQTT request may be tunneled and processed using the mobile device 152 as a proxy.

Computing devices described herein, such as the computing platform 104, mobile device 152, and telematics server 162, generally include computer-executable instructions where the instructions may be executable by one or more computing devices such as those listed above. Computer-executable instructions, such as those of the virtual network interface application 202 or virtual network mobile application 208, may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, Prolog, LISP, Corelet, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
  a mobile device programmed to
    receive a message from a vehicle computing platform via remote process communication (RPC),
    update an origin address of the message to indicate the mobile device,
    send the message to a destination address of the message,
    receive a response message from the destination,
    update a destination address of the response message to indicate the computing platform, and
    send the response message to the computing platform via the RPC.

2. The system of claim 1, wherein the message is sent from a vehicle application executed by the computing platform and communicating via MQ Telemetry Transport (MQTT) protocol.

3. The system of claim 1, wherein the message is sent from a vehicle application executed by the computing platform and communicating via file transfer protocol (FTP).

4. The system of claim 1, wherein the message is sent from a vehicle application executed by the computing platform and communicating via hypertext transfer protocol (HTTP).

5. The system of claim 1, wherein the origin address and the destination address are Internet Protocol (IP) addresses.

6. The system of claim 1, wherein the RPC is performed according to Smart Device Link (SDL) protocol.

7. The system of claim 1, wherein the mobile device includes a proxy programmed to update the origin address of the message and to update the destination address of the response message.

8. The system of claim 1, wherein the mobile device includes a data manager programmed to:
  translate the message from a format of the RPC to a format for transmission over a communication network to the destination address, and
  translate the response message from the format for transmission over the communication network to the format of the RPC.

9. A system comprising:
  a computing platform programmed to
    construct a remote procedure call (RPC) message by a virtual network interface application for a request received from a vehicle application for a network protocol unsupported by a mobile device, and
    send the RPC to the mobile device to cause the mobile device to update an origin address of the request to indicate the mobile device and send the request to a destination address of the request.

10. The system of claim 9, wherein the computing platform is further programmed to:
  query the mobile device for network protocols that are natively supported by the mobile device, and
  identify that the network protocol is unsupported by the mobile device according to the query.

11. The system of claim 9, wherein the computing platform is further programmed to:
  receive a second request from a second vehicle application for a second network protocol that is supported by the mobile device, and
  send the second request to the mobile device for processing by an application of the mobile device corresponding to the second network protocol.

12. The system of claim 9, wherein the computing platform is further programmed to:
  receive a response to the request from the mobile device, and
  send the response to the vehicle application.

13. The system of claim 9, wherein the origin address and the destination address are Internet Protocol (IP) addresses.

14. The system of claim 9, wherein the RPC is performed according to Smart Device Link (SDL) protocol.

15. The system of claim 9, wherein the computing platform is further programmed to receive a network status from the mobile device indicating details of a network connection provided by a physical network interface of the mobile device to a communications network over which the destination address is reached.

16. A method comprising:
  receiving, by a computing platform from a mobile device, indications of network protocols that are natively supported by the mobile device;
  receiving a request from a vehicle application utilizing a network protocol;
  sending the request to the mobile device for handling by a native application of the mobile device responsive to the network protocol being natively supported; and
  otherwise sending the request to the mobile application using a proxying approach.

17. The method of claim 16, wherein the proxying approach comprises:
  constructing a remote procedure call (RPC) message by a virtual network interface application, and
  sending the RPC to the mobile device to cause the mobile device to update an origin address of the request to indicate the mobile device and send the request to a destination address of the request.

18. The method of claim 17, further comprising performing the RPC according to Smart Device Link (SDL) protocol.

19. The method of claim 18, further comprising:
  receiving a response to the request from the mobile device, and
  sending the response to the vehicle application.

* * * * *